United States Patent [19]

Inkmann et al.

[11] Patent Number: 5,536,595
[45] Date of Patent: Jul. 16, 1996

[54] SPLIT SHELL BATTERY ENCLOSURE

[75] Inventors: Mark S. Inkmann, Wauwatosa; Michael T. Reher, Grafton; David W. Saari, South Milwaukee, all of Wis.

[73] Assignee: Globe-Union Inc., Milwaukee, Wis.

[21] Appl. No.: 316,289

[22] Filed: Sep. 30, 1994

[51] Int. Cl.⁶ .......................... H01M 10/50; H01M 2/10
[52] U.S. Cl. .......................... 429/120; 429/100; 429/176; 429/177; 429/187; 180/68.5
[58] Field of Search .................................. 429/148, 176, 429/177, 100, 187, 99, 120; 180/68.5

[56] References Cited

U.S. PATENT DOCUMENTS

| | | | |
|---|---|---|---|
| 2,360,056 | 10/1944 | Heitshu | 180/68.5 |
| 2,514,056 | 7/1950 | Hatfield | 180/68.5 |
| 2,607,433 | 8/1952 | Simi | 180/68.5 |
| 4,123,598 | 10/1978 | Hammel | 429/176 X |
| 4,265,984 | 5/1991 | Kaye | 429/176 X |
| 4,510,215 | 4/1985 | Adam | 429/100 X |
| 5,031,712 | 7/1991 | Karolek et al. | |
| 5,212,025 | 5/1993 | Shibata et al. | |
| 5,278,002 | 1/1994 | Hiers | 429/177 X |

*Primary Examiner*—John S. Maples
*Attorney, Agent, or Firm*—Harness, Dickey & Pierce

[57] ABSTRACT

A split-shell enclosure for a storage battery for motor vehicle includes identical first and second enclosure members which are dimensioned to fit around the battery, forming a shell structure, that is open at its top and bottom and partially encloses the battery on two sides and completely encloses the battery on the other two sides, forming a heat shield for protecting the battery from hot underhood temperatures, the enclosure members being adapted to snap together upon installation and to be held together by interlocking tongue and groove portions of mating sides of the enclosure members, upper portions of the enclosure members being disposed in juxtaposed relation with the handle brackets of the battery so that if the battery is lifted by the enclosure, the enclosure members will engage the handle brackets of the battery and the battery will effectively be lifted by its handle brackets and no load will be placed on the latches that hold the two sections of the enclosure together, and lower portions of the front and back walls of the enclosure being open to accommodate standard holddown mechanisms for the battery.

22 Claims, 6 Drawing Sheets

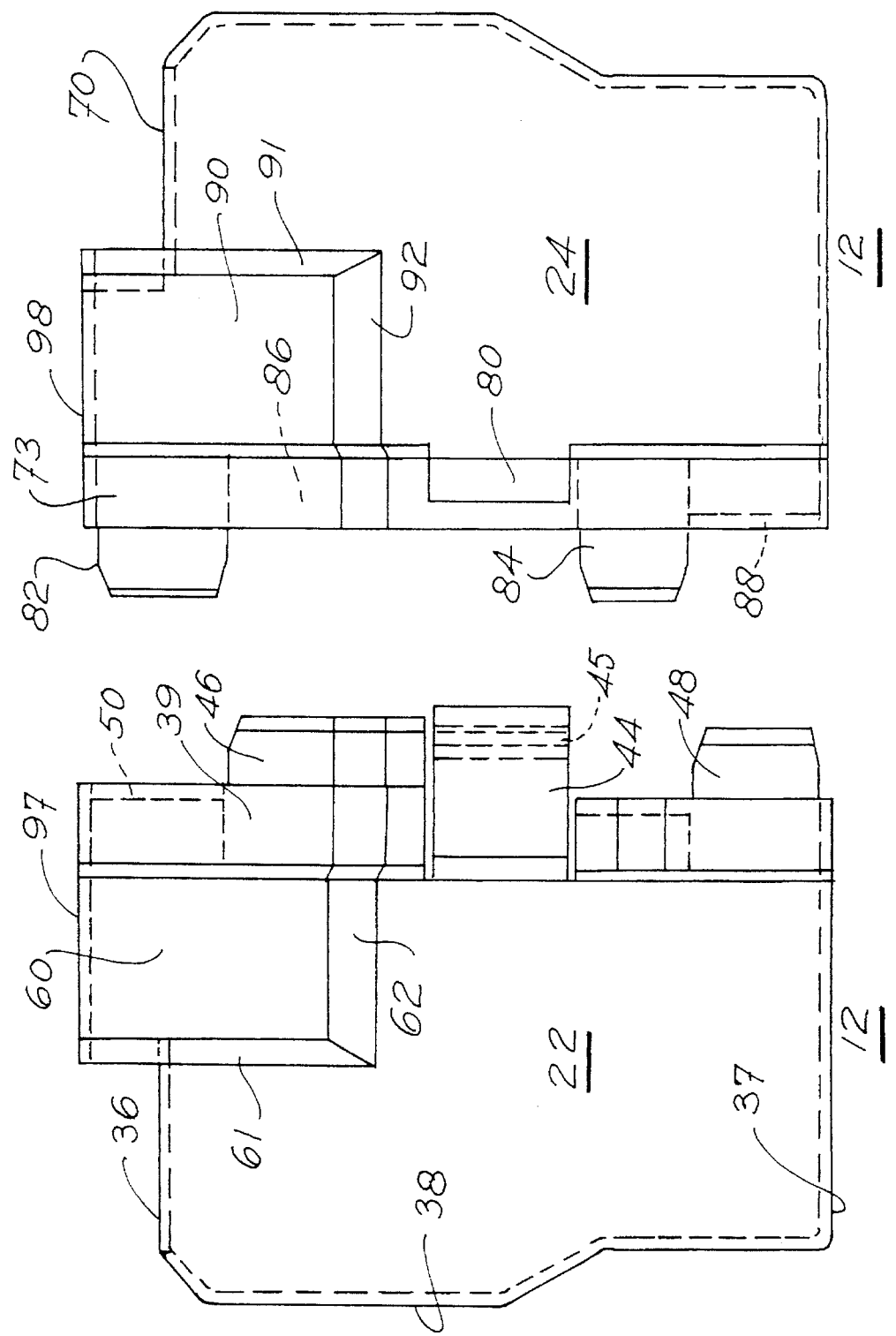

SPLIT SHELL BATTERY ENCLOSURE

BACKGROUND OF THE INVENTION

This invention relates to storage batteries for motor vehicles, and more particularly to an enclosure for protecting such batteries from hot underhood temperatures.

The automotive industry has recognized the need to protect motor vehicle batteries from the hot temperatures present in the vehicle engine compartment during operation of the vehicle. It is well established that subjecting the storage batteries to such heating accelerates corrosion of the battery grids which is a major factor in shortening of the lifetime of the battery. Conventionally, vehicle batteries are protected from underhood heating by placing an insulating shell or shield over the battery. Generally, the shield acts as an insulator, but the shield may be designed to provide an air gap between the sidewalls of the battery and the shield through which cooler outside air is circulated either by fan or as the result of vehicle motion. Typically, the insulating shell is mounted on the battery after the battery has been installed in the vehicle. However, it is generally recognized in the automotive industry that subassembly of the insulating shell with the battery prior to the final assembly line will reduce overall costs.

In U.S. Pat. No. 5,212,025 which was issued to Osamu Shibata et al. on May 18, 1993, there is disclosed a storage battery for automobiles which includes a heat shield that is designed to be a part of the battery assembly, making it easier to mount the battery in an automobile. The heat shield is a box-like structure having a closed bottom and which is open to the top to permit the battery to be positioned within the heat shield. The cover of the battery includes an overhang which extends downwardly from the peripheral edge of the cover, spaced outwardly from the sidewall of the battery container, defining a gap which receives the upper edge of the heat shield. This arrangement defines a space between the battery container and the heat shield that is closed to air outside of the heat shield. The heat shield is designed to be attached securely to the battery container. To this end, the battery container has recesses formed in its sidewalls for receiving projections on the heat shield to detachably secure the heat shield to the battery. Although it appears that this arrangement would provide improved thermal insulation for the battery, the arrangement requires a non-standard cover for the battery to define the air gap and a non-standard container to provide the latching recesses in its for securing the heat shield to the battery. Also, because the heat shield has a closed bottom, the battery must be lifted in order to position it within the heat shield. In addition, this arrangement requires modification of the battery hold down tray and hold down hardware.

SUMMARY OF THE INVENTION

The present invention provides an enclosure for a storage battery for a motor vehicle for thermally insulating the battery from underhood heat. The enclosure includes first and second enclosure members which are adapted to be assembled together on the battery, forming a shell structure that has a front, a back and first and second sides and which has an open top and an open bottom. The shell structure is dimensioned to fit around the container portion of the battery, at least partially enclosing the sidewalls of the battery container. A latching means secures the first enclosure member to the second enclosure member. In accordance with a preferred embodiment, the latching means comprises a tongue and notch arrangement that is provided on mating sides of the two enclosure members that form the shell structure, so as to be releasable. The mating side edges also include a plurality of tabs which are received in complementary recesses, serving as a means for guiding the latching tongues into the notches. The tabs and complementary recesses also restrict relative movement between the enclosure members to singular dimensional or in and out movement only so as to prevent sideways and/or up-and-down relative movement between the two enclosure members. The enclosure members include means for providing a thermal barrier, or air gap for air flow, between the shell structure and the sidewalls of the battery container. In one embodiment, the cavity includes insulating material which provides an insulating layer between the shell structure and the sidewalls of the battery container. In another embodiment, air within the cavity provides an insulating layer between the shell structure and the sidewalls of the battery container.

In accordance with a feature of the invention, the first and second enclosure members are identical to one another in size and shape. The two identical halves which form the shell structure are adapted to snap together upon installation. The enclosure is adapted to engage the handle area of the battery if the battery is lifted by the shell structure so that the shell structure will maintain a firm engagement with the battery for safety and no load will be placed on the latching means that holds the two shell sections of the enclosure together. Also, if the battery is lifted, the shell structure will maintain a firm engagement with the battery for safety and no load will be placed on the latching means that holds the two shell sections of the enclosure together.

The battery enclosure is adapted to be mounted onto a conventional battery and is removable and replaceable onto another similar battery. Moreover, the battery enclosure provided by the present invention does not require modification of the battery hold down tray or hold down hardware. The split shell battery enclosure provided by the present invention is more space efficient, cost effective and thermally effective than comparable existing battery enclosures.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

FIG. 5 is a right side view of the battery enclosure member shown in FIG. 3;

FIG. 6 is a left side view of the battery enclosure member shown in FIG. 3; and

DESCRIPTION OF THE PREFERRED EMBODIMENTS

Figure 1:
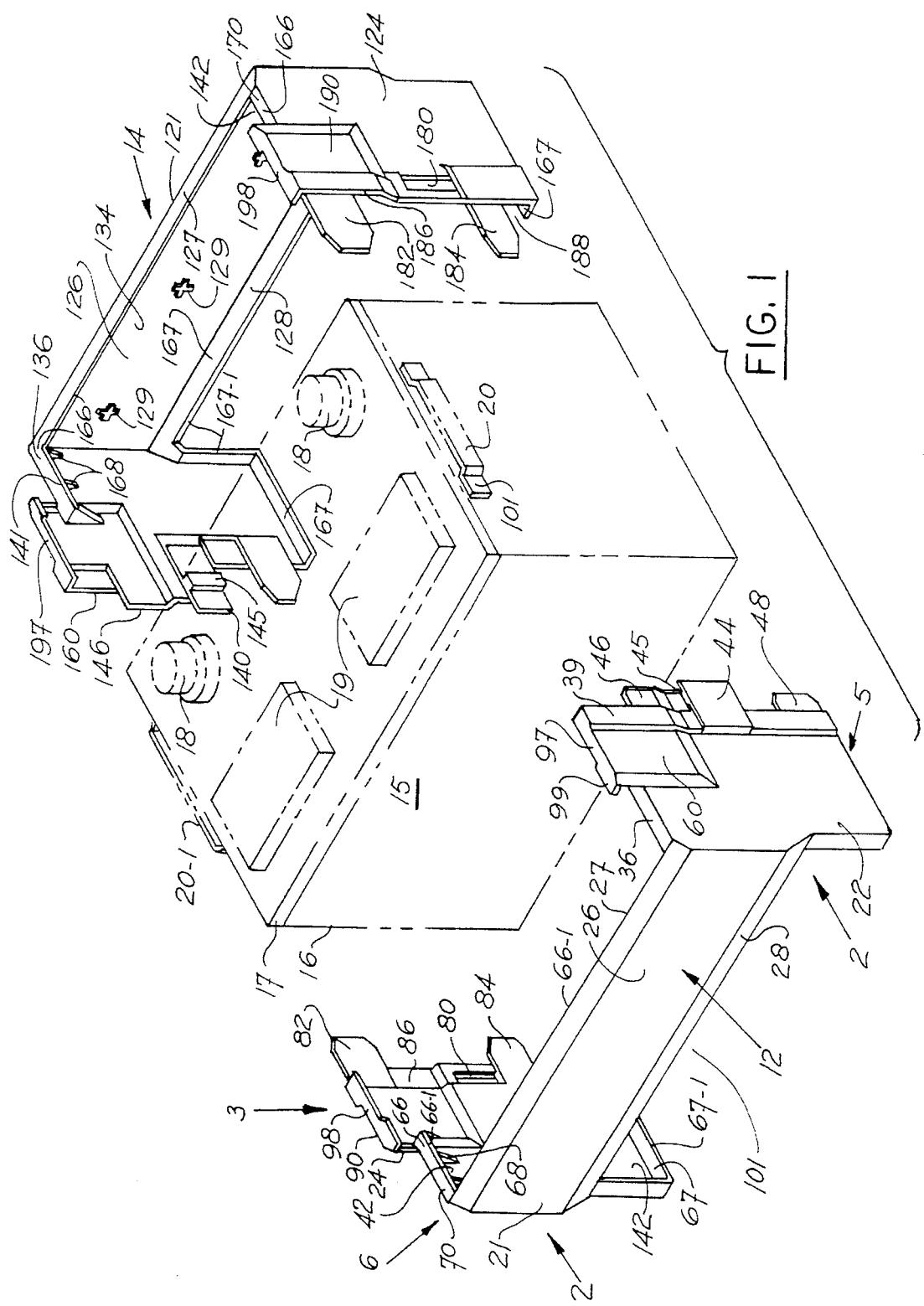
FIG. 1 is an exploded perspective view illustrating the split shell battery enclosure provided by the present invention with the battery shown in phantom.
Figure 2:
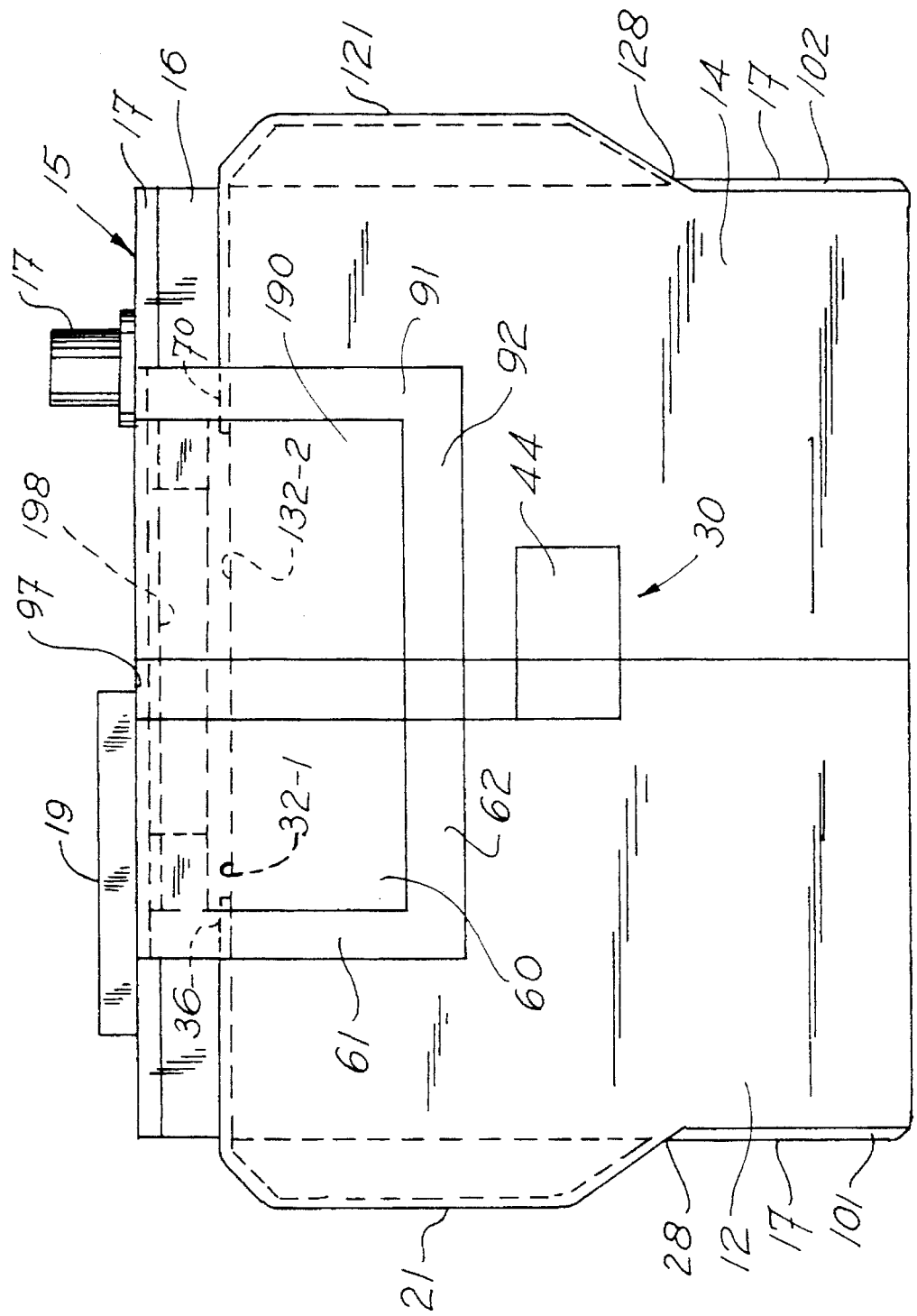
FIG. 2 is a side view of the split shell battery enclosure which is shown mounted on a battery, and showing the spacial relationship between the enclosure and one of the battery handle brackets.

Referring to FIGS. 1 and 2 of the drawings, the split shell battery enclosure provided by the present invention is adapted to be mounted on a storage battery 15 for a motor vehicle, enclosing the sides of the battery to protect the battery from hot underhood temperatures produced in the engine compartment of the motor vehicle in which the battery is located. The battery 15 is a conventional battery and includes a container 16 for the battery cells and a cover 17 that mounts the positive and negative battery terminals 18. The cover includes vent openings which are covered by covers 19. In addition, the battery 15 has handle attachments or brackets 20 and 20-1 formed integrally with the sides of the container 16 to facilitate lifting of the battery.

The split shell battery enclosure includes two enclosure members 12 and 14 which are dimensioned to fit around the storage battery 15 and to be connected together forming a shell structure. The split shell battery enclosure is open at the top and bottom and partially encloses two of the sidewalls of the battery container 16 and fully encloses the other two sidewalls thereof as will be shown. One of the enclosure members 12 is located at the front side of the battery 15 and the other enclosure member 14 is located at the back side of the battery. The two enclosure members 12 and 14 are connected and held together by interlocking portions of the mating sides of the enclosure members which form a latching arrangement at each side of the battery enclosure as will be described, one of the latching arrangements being indicated by reference numeral 30 in FIG. 2.

In accordance with a feature of the invention, the two enclosure members 12 and 14 are identical to one another in size and shape. The enclosure members 12 and 14 are molded from a rigid plastic material such as polypropylene. The walls of the two enclosure members are approximately 0.080 inches thick. Because the two members are identical to one another in size and shape, the two enclosure members can be molded from the same mold.

Figure 3:
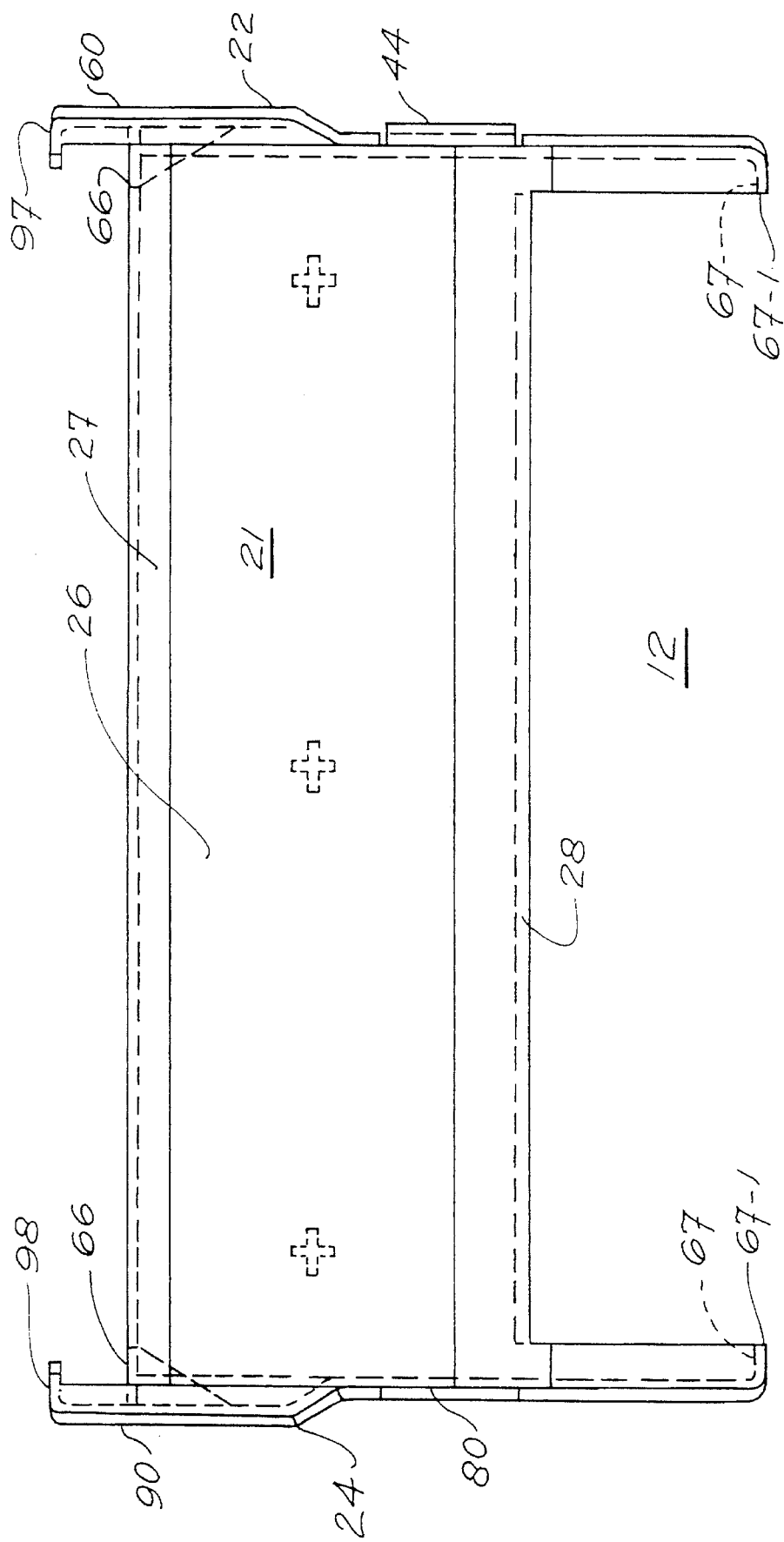
FIG. 3 is a front elevation view of one enclosure member of the battery enclosure provided by the present invention.
Figure 4:
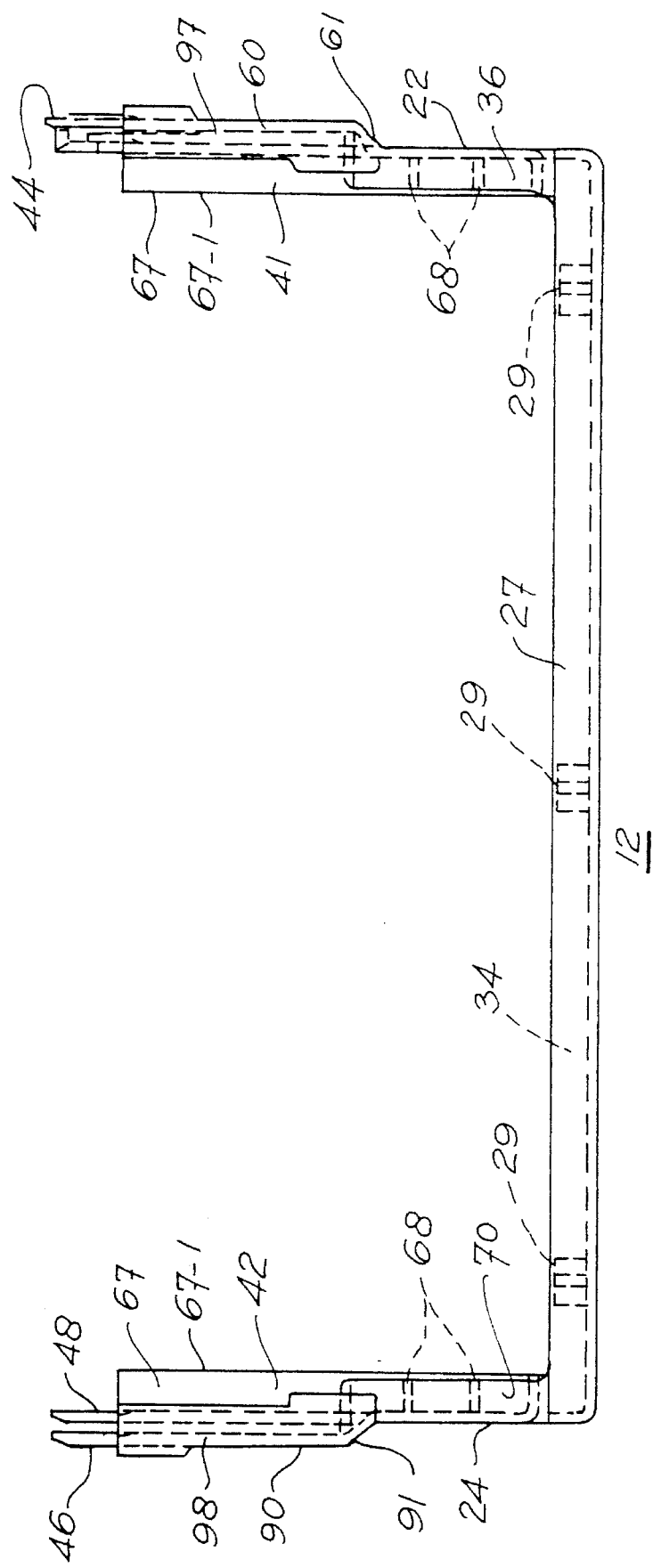
FIG. 4 is a top plan view of the battery enclosure member shown in FIG. 3.

Referring to FIGS. 1, 3 and 4, the enclosure member 12 is a one-piece member including a front 21 and sides 22 and 24 which extend rearwardly at a right angle to the front defining a generally U-shaped cross-section for the enclosure member. The front 21 of enclosure member 12 includes a panel portion 26 that is generally rectangular in shape and has horizontally extending upper and lower peripheral edges 27 and 28 which slant rearwardly from the panel portion 26.

Similarly, enclosure member 14 is a one-piece member including a front 121 and sides 122 and 124 which extend rearwardly at a right angle to the front defining a generally U-shaped cross-section for the enclosure member. The front 121 of enclosure member 14 includes a panel portion 126 that is generally rectangular in shape and has horizontally extending upper and lower peripheral edges 127 and 128 which slant rearwardly from the panel portion 126.

Because the two enclosure members 12 and 14 are identical in size and shape to one another, only enclosure member 12 is described in detail and elements of enclosure member 14 have been given the same reference numeral as corresponding elements of enclosure member 12, but incremented by "100".

Referring to FIGS. 1, 4, 5 and 7, the side 22 of enclosure member 12 is generally rectangular in shape and has an upper edge 36, a lower edge 37, a forward edge 38 and a rearward edge 39. The rearward edge 39 includes a tongue 44 having an extension 45 at its free end which forms a portion of the latching arrangement 30 and which is received in a cutout or notch 180 in side 124 of the mating enclosure member 14. Side 22 includes an upper tab 46 and a lower tab 48 which are received in respective complementary slots 186 and 188 in side 124 of the mating enclosure member 14 when the enclosure members are assembled together. Further, side 22 includes an upper slot 50 and a lower slot 52 which receive respective tabs 182 and 184 formed on side 124 of the enclosure member 14. The side 22 has a raised portion 60 near its upper edge 36, the upper part 97 of which extends above upper edge 36. The raised portion 60 has sloping sides 61 and 62. The raised portion 60 cooperates with a raised portion 190 of side 124 when the enclosure members are assembled together to define a compartment for the handle bracket 20 on the right side of the battery as will be shown. It is pointed out that while in a preferred embodiment, the latching arrangement is provided by tongue and notch pairs formed on mating edges of the enclosure members, this is not intended to be a limitation on the scope of the invention, and the enclosure members can be latched together in other ways including by latching mechanisms that separate from one or both of the enclosure members.

Referring to FIGS. 1, 4, 6 and 7, the side 24 is somewhat similar to side 22, being generally rectangular in shape and having an upper edge 70, a lower edge 71, a forward edge 72 and a rearward edge 73. The rearward edge 73 includes a cutout or notch 80 that receives an extension 145 of the tongue 140 that is formed on side 122 of the mating enclosure member 14, the tongue and notch together defining a portion of the latching arrangement that is located at the left side of the battery enclosure. In addition, side 24 includes an upper tab 82 and a lower tab 84 which are received in respective complementary slots 150 and 152 in the mating enclosure member 14. Further, side 24 includes an upper slot 86 and a lower slot 88 which receive respective tabs 146 and 148 of the enclosure member 14. The side 24 has a raised portion 90 near its upper edge 70, the upper part 98 of which extends above the upper edge 70. Raised portion 90 has sloping sides 91 and 92. The raised portion 90 cooperates with a raised portion 160 of side 122 when the enclosure members are assembled together to define a compartment for the handle bracket 20-1 on the left side of the battery.

The enclosure member 12 has an upper inwardly directed flange 66 defined by the upper edge 36 of side 22, the upper edge 27 of the front 26 and the upper edge 70 of side 24. The enclosure member 12 has a lower inwardly directed flange 67 defined by the lower edge 37 of side 22, the lower edge 28 of the front 26 and the lower edge 71 of the side 24. The outer edges 66-1 and 67-1 of the flanges 66 and 67 engage the sides of the battery container when the enclosure members are assembled thereon so that the inner surface 26-1 of the front 26 is spaced outwardly from the outer wall of the battery container 16, defining a forward cavity 34 for the enclosure member, and the inner surfaces 22-1 and 24-1 of sides 22 and 24 are spaced outwardly from the outer wall of the battery container 16, defining respective side cavities 41 and 42 for the enclosure member. The enclosure member 14 similarly defines forward cavity 134 and side cavities 141 and 142.

Figure 7:
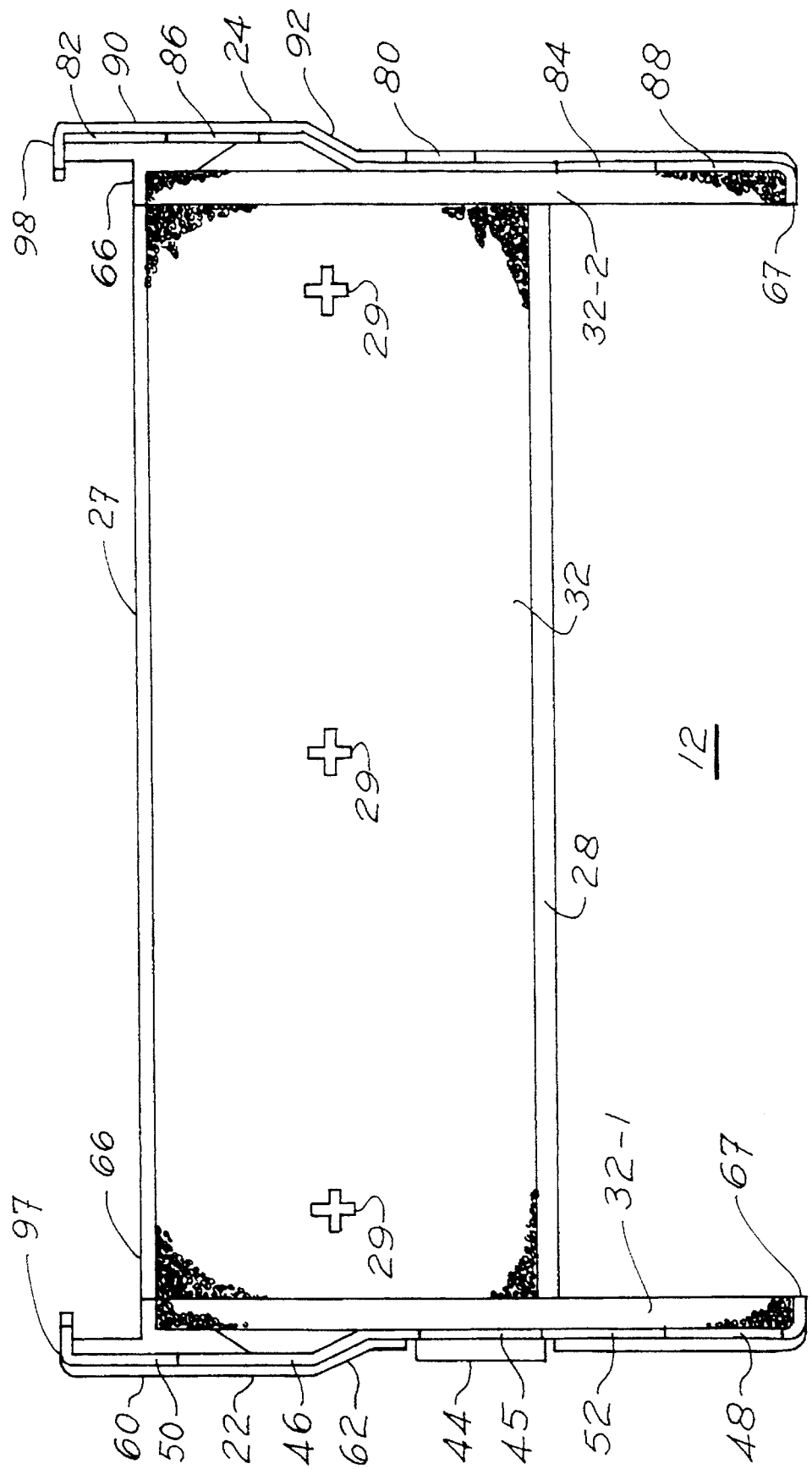
FIG. 7 is a rear elevation view of the enclosure member.

Referring to FIG. 7, insulating material is attached to the inside of the enclosure members, including insulating material 32 located in the front cavity 34 and insulating material 32-1 and 32-2 located in respective side cavities 41 and 42 of the enclosure members 12 and 14. In the exemplary embodiment, the insulating material is a closed cell polypropylene in sheet form. The sheets of insulating material are generally rectangular in shape and are about ¼ inch thick. The insulating material is not shown in FIGS. 1 and 3–6 to better illustrate details of the inner surfaces of the enclosure members 12 and 14.

The portion of the flanges defined by inwardly directed edges 27 and 28 of the front 21 support the sheet of insulating material 32 at its top and bottom and the inwardly directed flanges 66 and 67 support the sheets 32-1 and 32-2 of insulating material at the bottom and both sides. A plurality of locators 29, which are molded into the inner surfaces 21-1 and 22-1 of the panel portions and a plurality of locator ribs 68, which are molded into the inner surfaces of the sides 22 and 24 near their upper edges, attach the sheets of insulating material 32, 32-1 and 32-2 to the inner walls of the enclosure member 12. Likewise, for enclosure member 14, the portion of the flanges defined by inwardly directed edges 127 and 128 of the front 121(FIG. 1) support a sheet of insulating material at its top and bottom and the inwardly directed flanges 166 and 167 support sheets of insulating material at the bottom and both sides. Locators 129 and ribs 168 attach the sheets of insulating material to the inner surfaces of the enclosure member 14.

Digressing, the front cavities 24 and 124 and the side cavities 41, 42, 141, and 142 defined by the recessed inner wall of the members may serve as an air space or air gap between the outer surface of the battery container and the inner surface of the split shell battery enclosure. In this embodiment, insulation material is not provided in the cavities and the air in the cavities acts as a barrier layer between the outer sidewalls of the battery and the inner surfaces of the enclosure members. The edge surfaces of the enclosure members, such as the edge surfaces may include a sealing material to enhance the seal between the edges of the enclosure members and the outer surfaces of the battery container when insulating material is not provided in the interior of the enclosure members.

Both of these foregoing arrangements are passive insulation arrangements. It is apparent that the enclosure members can be provided with one or more suitable air inlets and outlets to allow cooler outside air to be circulated either by fan or as the result of vehicle motion through the inner cavity defined by the enclosure members by to provide active cooling.

The enclosure members 12 and 14 are adapted to be snapped together with the edge of side 22 of member 12 cooperating in a locking relationship with the edge of side 124 of member 14 and with the edge of side 124 of member 14 cooperating in a locking relationship with the edge of side 22 of member 12. To assemble the enclosure members together, the enclosure members are positioned opposite one another, one at the front and one at the back of the battery, with the tabs 46 and 48 of enclosure member 12 aligned with the recesses 186 and 188 of enclosure member 14 and with the tabs 146 and 148 of enclosure member 14 aligned with the recesses 86 and 88 of enclosure member 12. The series of tabs and mating recesses form a guiding arrangement which aligns the tongues 44 and 144 with the notches 180 and 80 so that as the enclosure members are moved toward one another, the extensions snap into the notches. When the enclosure members are assembled together, the tabs 46 and 48, tabs 82 and 84, tabs 146 and 148, and tabs 182 and 184 restrict relative movement between the enclosure members to one dimensional movement only so as to prevent sideways and/or up-and-down relative movement between the two enclosure members. The tabs 46, 48, 82, 84, 146, 148, 182 and 184 are substantially the same size. Moreover, the distal ends of the tabs 46, 48, 82, 84, 146, 148, 182 and 184 are bevelled to enhance their ability to slide into the associated recesses.

Moreover, the enclosure members can be removed from the battery and placed on another battery of the same size. All that is necessary is that the tongues 44 and 144 be flexed outward slightly, both at the same or one at a time, using slight outward finger pressure, until their extensions 49 and 149 clear the associated notches 180 and 80. Although the front and sides of the two enclosure members are rigid, the cantilever extending tongues are sufficiently flexible as to be capable of being flexed out of the notch to release the two enclosure members from one another, permitting removal of the enclosure from the battery.

Because of the split-shell construction of the battery enclosure, the enclosure members can be assembled on a battery without lifting the battery. The connection areas 30 at the sides is sufficiently contoured as to avoid contact with critical areas of the battery such as the terminal area at the top of the battery and the holddown area at the bottom of the battery. Referring to FIGS. 1, 2 and 3, the lower edge 28 of the front portion 21 is spaced vertically above the lower edges of the sides 22 and 24 defining an opening 101 (FIG. 2) to accommodate the holddown mechanism (not shown) for the battery. The front portion 121 of enclosure member 14 is similarly configured to define an opening 102 (FIG. 2) for the same purpose. The upper edge 27 of the front portion 21 extends below the height of the battery cover 17, maximizing accessibility to the battery terminal area. The front 21 of the enclosure members can include a notch (not shown) along their upper peripheral edges, allowing the split-shell battery enclosure to be used with side terminal batteries.

Referring to FIGS. 1–3 and 7, the upper edge of the raised portion 60 of side 22 cooperates with a raised portion 190 of side 124 when the enclosure members are assembled together to define a compartment for the handle bracket 20 on the right side of the battery. More specifically, the upper edges of the raised portions 60 and 190 define an inwardly directed flanges 97 and 198 which cooperate with the handle bracket 20 of the battery. The outer end of flange 97 includes an extension 99 that conforms to the contour of the handle (not shown) as at 101. Similarly, the upper edges of the raised portions 90 and 160 define inwardly directed flanges 98 and 197 which cooperate with the handle bracket 20-1 of the battery.

The flanges 97 and 197 overlie the upper surfaces of the battery handle brackets when the enclosure members are assembled on the battery as shown in FIG. 2. Thus, if the battery is lifted by its container or by its terminals, the upper surfaces of the battery handle brackets 20 and 20-1 will be moved into engagement with the lower surfaces of the flanges 97 and 198 and the flanges 98 and 197 so that the battery enclosure will be lifted along with the battery.

The lower surface of the battery handle bracket 20 is located juxtaposed with the upper surfaces 36 and 170 of the sides 22 and 124, as is shown in FIG. 2. Similarly, the lower surface of the battery handle bracket 20-1 is located juxtaposed with the upper surfaces 70 and 136 of the sides 24 and 122. Thus, if the battery is lifted by the enclosure, the enclosure members will be moved into engagement with the lower surface of the handle brackets 20 and 20-1 so that the battery will effectively be lifted by its handle brackets. Thus, the latch mechanism of the battery enclosure does not carry lifting loads, and will not be released inadvertently if the battery is lifted either by the battery housing or by the enclosure.

It has been found that the split shell battery enclosure provided by the present invention produces an estimated 4% improvement in battery life with insulating material that is ¼ inch in thickness. As has been described, in accordance with one embodiment of the invention, the split-shell battery enclosure includes insulating material which provides passive insulation of the battery that is being protected. In another embodiment, the split-shell battery enclosure defines a closed air space or air gap between the outer surface of the battery container and the inner surface of the enclosure which insulates the battery from underhood heat. Moreover, the battery may be a part of a thermal management system that supplies forced air cooling by moving air through the cavity of the split-shell battery enclosure.

While the invention has been described with reference to preferred embodiments, various modifications can be made without departing from the spirit and scope of the invention as defined in the appended claims. For example, although in accordance with the preferred embodiment, the split shell battery enclosure has an open bottom, the bottom portion of the split shell enclosure can be closed so that the battery enclosure can protect the bottom of the battery. Also, the battery enclosure can be provided with front, back and sides that fully enclose the battery on all four sides. In the latter arrangement, suitable modification would be required to the battery hold down tray or hold down hardware.

What is claimed:

1. An enclosure for a storage battery for a motor vehicle for thermally insulating said battery from underhood heat, said battery including a container portion having sidewalls and a cover portion that is mounted on said container portion, said enclosure comprising:

first and second enclosure members adapted to be assembled together on said battery, forming a shell structure having a front, a back, and first and second sides and which have an open top and an open bottom, said shell structure being dimensioned to fit around said container portion of said battery, at least partially enclosing said sidewalls of said battery container portion;

latching means for securing said first enclosure member to said second enclosure member;

said enclosure members including means for providing a thermal barrier between said shell structure and said sidewalls of said battery container.

2. The enclosure according to claim 1, wherein said front, back, and sides of said shell structure include inwardly directed portions that contact said sidewalls of said battery container portion when said enclosure members are assembled on said battery, whereby inner surfaces of said front, back, and sides of said shell structure are spaced apart from said sidewalls of said battery container portion defining a cavity therebetween.

3. The enclosure according to claim 2, and including insulating material filling said cavity to provide an insulating layer between said shell structure and said sidewalls of said battery container.

4. The enclosure according to claim 2, wherein said cavity contains air to provide an insulating layer between said shell structure and said sidewalls of said battery container.

5. The enclosure according to claim 1, wherein said first and second enclosure members are identical to one another in size and shape.

6. The enclosure according to claim 1, wherein said latching means is constructed and arranged to be releasable to permit the removal of said first and second enclosure members from the battery.

7. The enclosure according to claim 1, wherein said first enclosure member has a front and first and second sides, and said second enclosure member has a front and first and second sides, said first and second sides of said first enclosure member being adapted to mate with said second and first sides, respectively, of said second enclosure member when said first and second enclosure members are assembled together, and wherein said latching means includes at least one latching member projecting from said first side of said first enclosure member and means on said second side of said second enclosure member for receiving said latching member.

8. The enclosure according to claim 7, wherein said first and second sides of said first enclosure member extend at a right angle to said front of said first enclosure member, defining a generally U-shape for said first enclosure member, and wherein said first and second sides of said second enclosure member extend at a right angle to said front of said second enclosure member, defining a generally U-shape for said second enclosure member.

9. The enclosure according to claim 7, wherein said sides of said first enclosure member have edges including portions that are adapted to snap together with edges of said sides of said second enclosure member.

10. The enclosure according to claim 9, wherein said latching means includes at least one tongue on one of said edges of said first enclosure and a notch on the mating edge of said second enclosure member.

11. The enclosure according to claim 1, wherein said front and back of said shell structure each defines an opening near a lower edge thereof for providing access for a holddown mechanism for said battery.

12. The enclosure according to claim 7, wherein said battery has first and second handle brackets, each having an upper surface and a lower surface, and wherein first and second sides of said first enclosure member have extension portions that cooperate with extension portions of said second and first sides of said second enclosure member to form first and second compartments for locating said first and second handle brackets of said battery, and said extension portions having inner surfaces located to be engaged by said upper surface of said handle brackets of said battery when said battery is lifted relative to said shell structure, thereby causing said shell structure to be lifted along with said battery.

13. The enclosure according to claim 7, wherein said battery has first and second handle brackets, each having an upper surface and a lower surface, and wherein first and second sides of said first enclosure member have extension portions that cooperate with extension portions of said second and first sides of said second enclosure member to form first and second compartments for locating said handle attachments, said first and second enclosure members each including means that is moved into engagement with said lower surface of said battery handle brackets when said shell structure is lifted relative to said battery to cause said battery to be lifted along with said shell structure.

14. The enclosure according to claim 7, wherein said first and second sides of said first enclosure member have respective first and second edges, and said first and second sides of said second enclosure member have respective third and fourth edges, said first and third edges each including first and second outwardly projecting tabs and said second and fourth edges each including first and second slots for receiving said tabs of said first and third edges, respectively when said enclosure members are assembled together.

15. The enclosure according to claim 14, wherein said second and fourth edges each include third and fourth outwardly projecting tabs, and said first and third edges each include first and second slots for receiving said outwardly projecting tabs of said second and fourth edges, respectively, when said first and second enclosure members are assembled together.

16. The enclosure according to claim 15, wherein said first and second tabs on first edge of said first member are aligned, and wherein said first and second tabs on first edge of said second member are aligned, whereby said tabs cooperate with said slots to limit relative movement between said first and second enclosure members to a single axis.

17. An enclosure for a storage battery for a motor vehicle for thermally insulating said battery from underhood heat, said battery including a container portion and a cover portion that is mounted on said container portion to form a unitary housing for the battery, said enclosure comprising:

a first enclosure member having a front side and first and second parallel extending sides which extend outwardly from and perpendicular to said front side, defining a generally U-shape for said first enclosure member;

a second enclosure member that is identical in size and shape to said first enclosure enclosure having a front side and first and second parallel extending sides which extend outwardly from and perpendicular to said front side, defining a generally U-shape for said second enclosure member;

said first and second enclosure members being adapted to be assembled together on said battery forming a shell structure that is dimensioned to fit around said housing of said battery;

latching means for securing said first and second enclosure members together;

said enclosure members including means for providing a thermal barrier between said shell structure and sidewalls of said battery container.

18. The enclosure according to claim 17, wherein said latching means is constructed and arranged to be releasable to permit the removal of said first and second enclosure members from the battery.

19. The enclosure according to claim 17, wherein said front, back and sides of said shell structure include inwardly directed portions that contact said sidewalls of said battery container portion when said enclosure members are assembled on said battery, whereby inner surfaces of said front, back and sides of said shell structure are spaced apart from said sidewalls of said battery container portion defining a cavity therebetween.

20. The enclosure according to claim 19, and including insulating material filling said cavity providing an insulating layer between said shell structure and said sidewalls of said battery container.

21. The enclosure according to claim 17, wherein said first enclosure member has a front and first and second sides, and said second enclosure member has a front and first and second sides, said first and second sides of said first enclosure member being adapted to mate with said second and first sides, respectively, of said second enclosure member when said first and second enclosure members are assembled together, and wherein said latching means includes at least one latching member projecting from said first side of said first enclosure member and means on said second side of said second enclosure member for receiving said latching member.

22. The enclosure according to claim 21, wherein at least said first sides of said first and second members include outwardly projecting tabs, and at least said second sides of said first and second members include recesses for receiving said tabs when said enclosure members are assembled together.

* * * * *

UNITED STATES PATENT AND TRADEMARK OFFICE
CERTIFICATE OF CORRECTION

PATENT NO. : 5,536,595
DATED : July 16, 1996
INVENTOR(S) : Mark S. Inkmann et al.

It is certified that error appears in the above-indentified patent and that said Letters Patent is hereby corrected as shown below:

On the title page: Item [57]

under "Attorney, Agent, or Firm", "Harness, Dickey & Pierce" should be --Harness, Dickey & Pierce, P.L.C.--.

Column 9, line 28, claim 17, "enclosure" (second occurrence) should be --member--.

Signed and Sealed this

Fourth Day of March, 1997

Attest:

BRUCE LEHMAN

Attesting Officer      Commissioner of Patents and Trademarks